Sept. 23, 1969      H. PESCH ET AL      3,468,225
              CONTAINER ASSEMBLING MACHINE
Filed Dec. 30, 1966                10 Sheets-Sheet 1
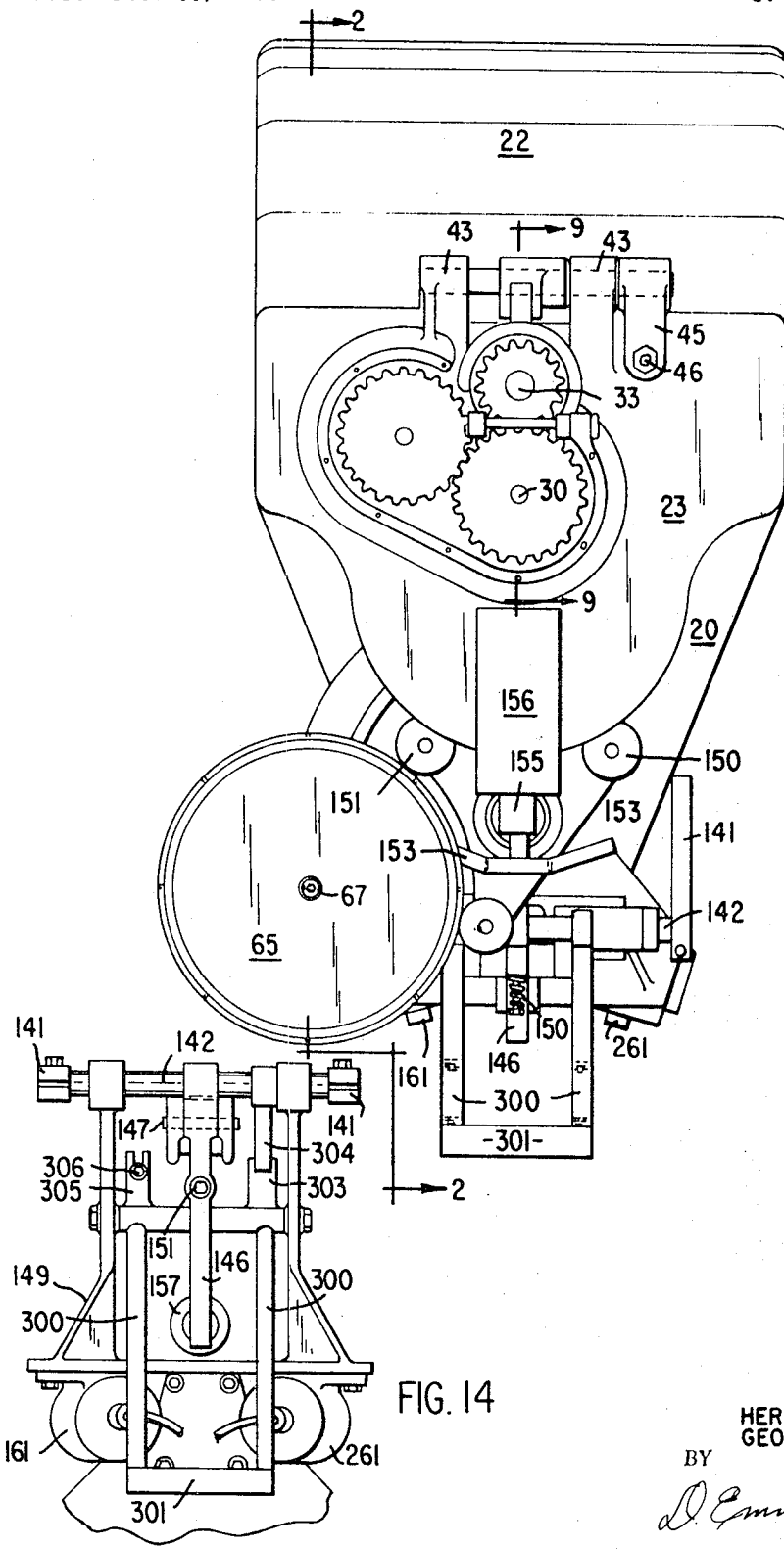
INVENTORS.
HERMAN PESCH.
GEORGE Z. ANGELL.
BY
D. Emmett Thompson
ATTORNEY.

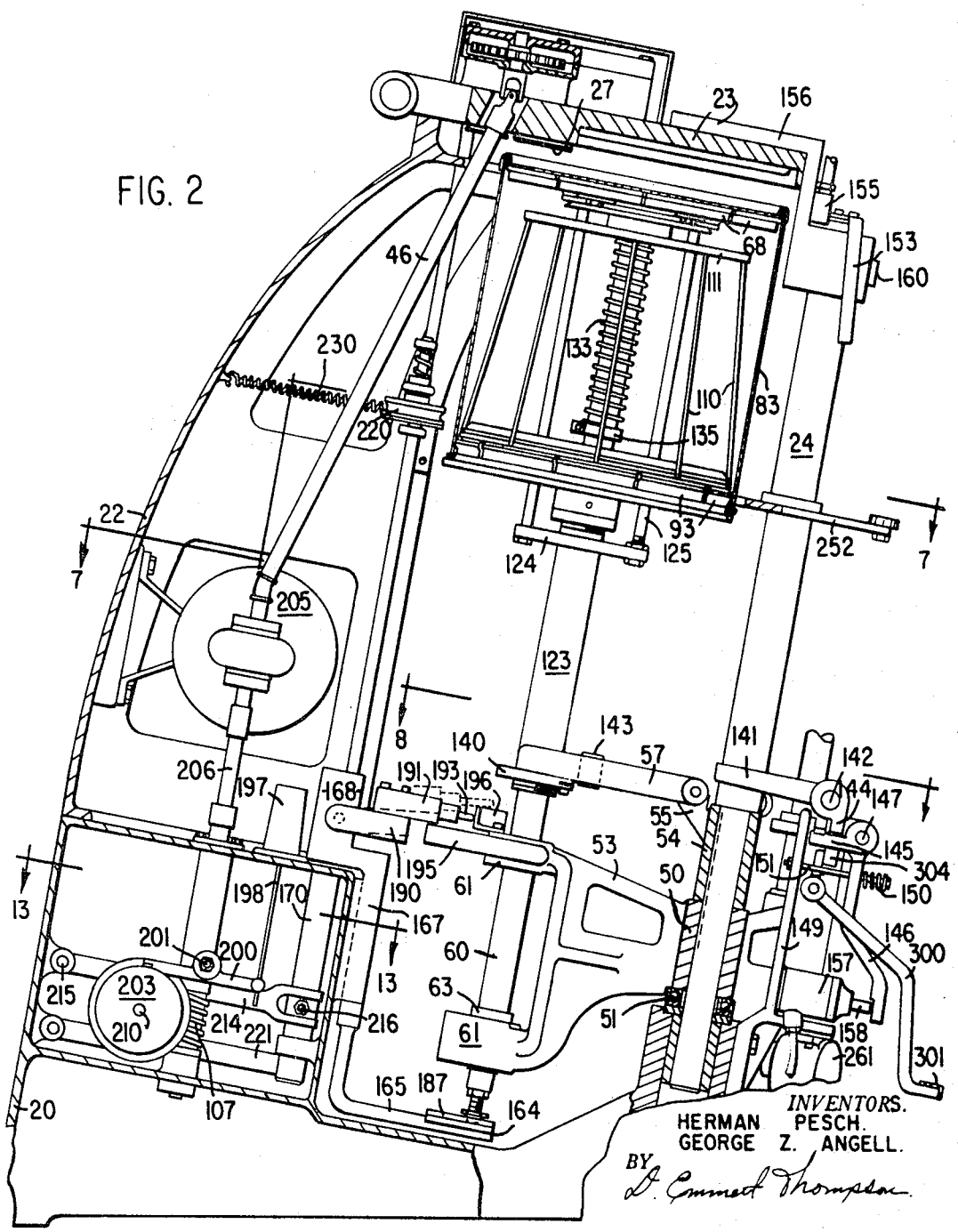

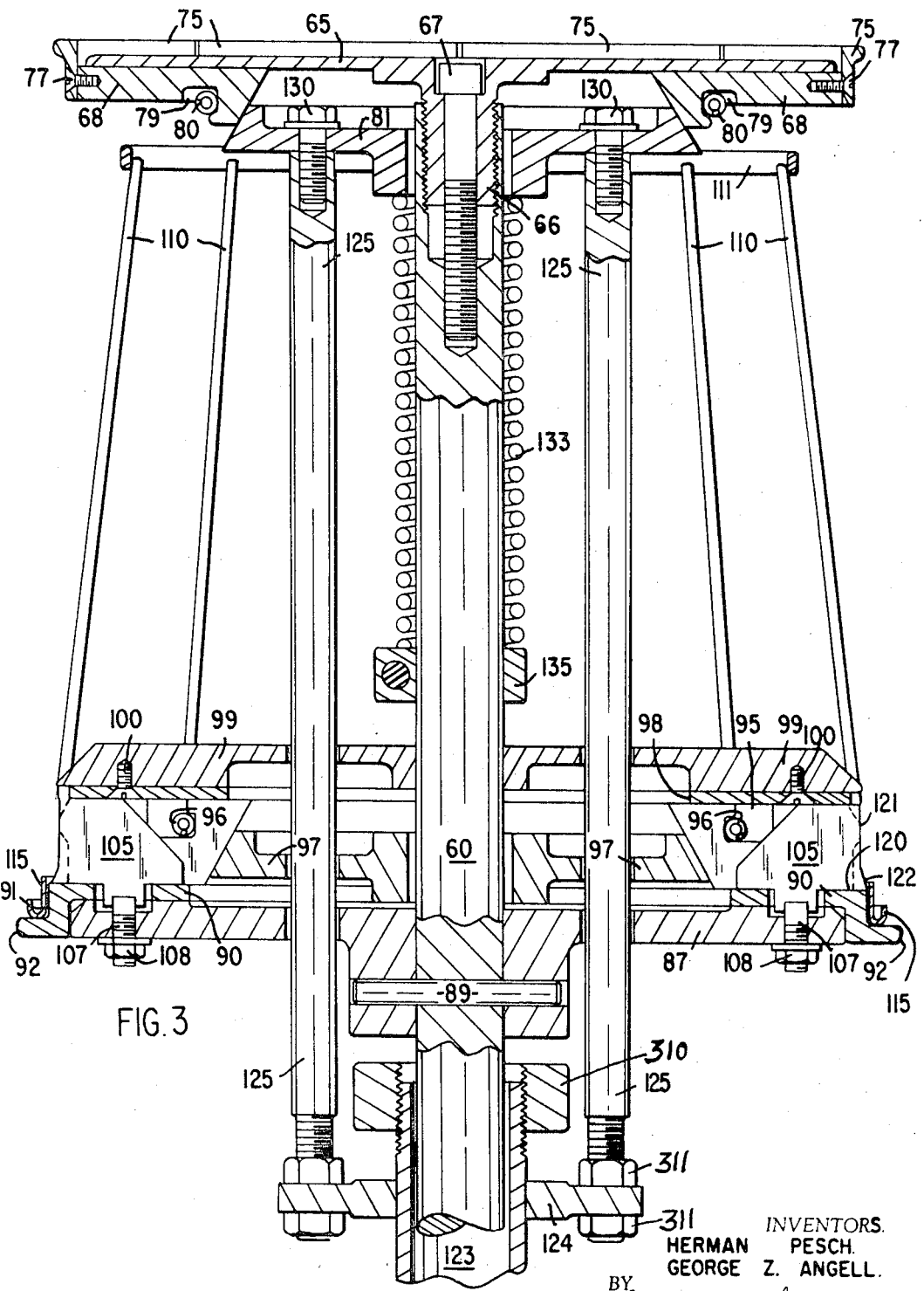

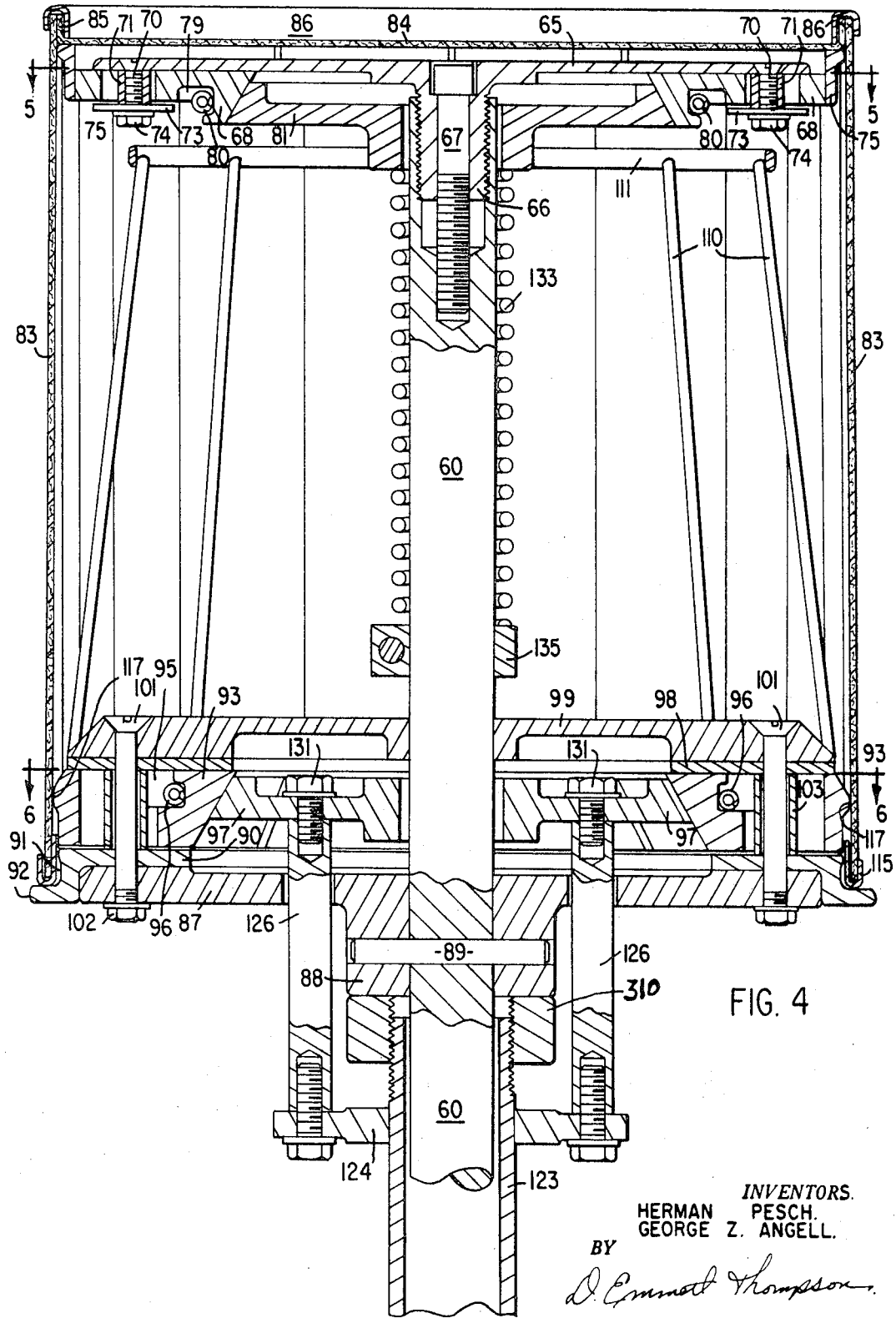

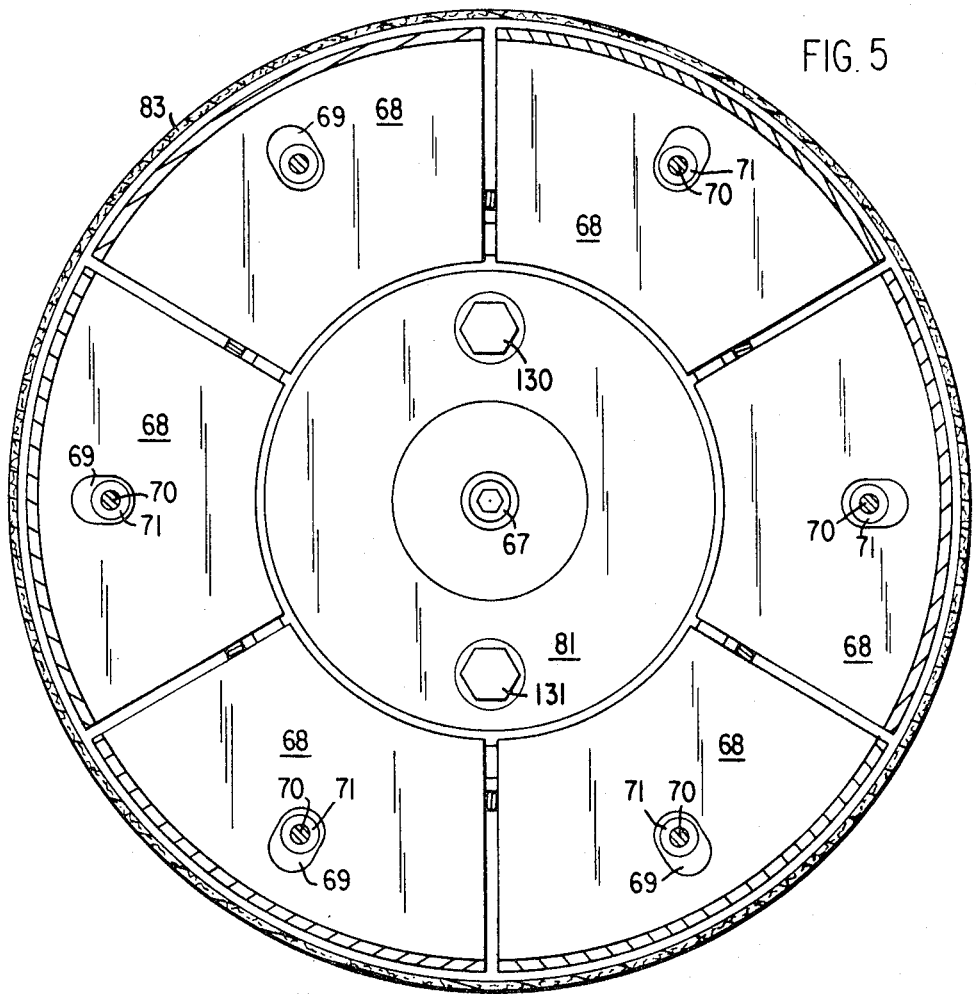
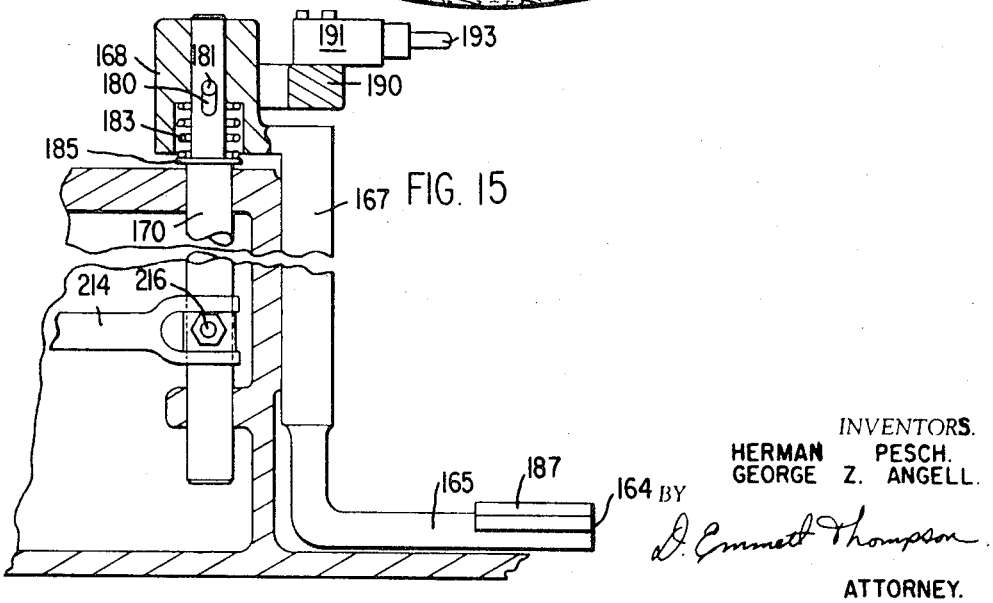

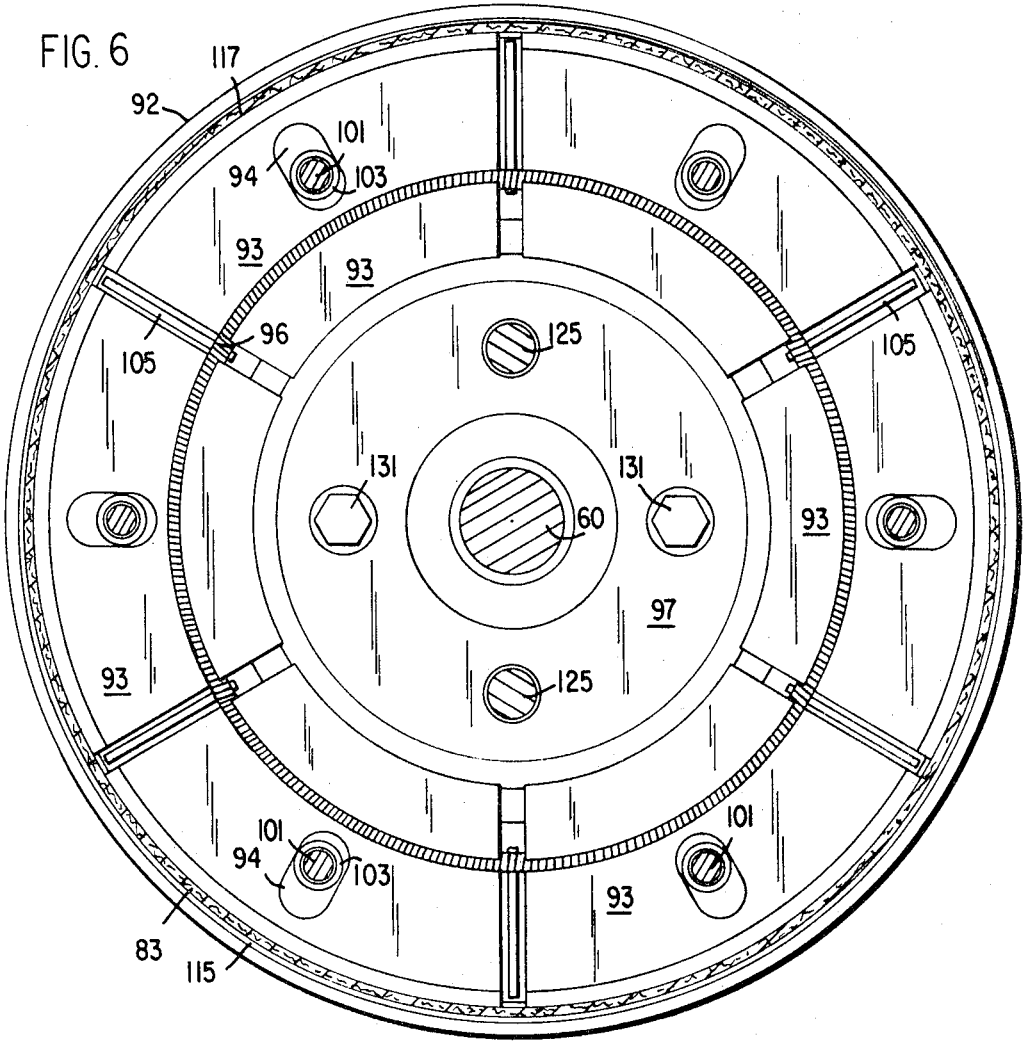

Sept. 23, 1969  H. PESCH ET AL  3,468,225
CONTAINER ASSEMBLING MACHINE
Filed Dec. 30, 1966  10 Sheets-Sheet 7

INVENTORS.
HERMAN PESCH.
GEORGE Z. ANGELL.
BY
D. Emmett Thompson
ATTORNEY.

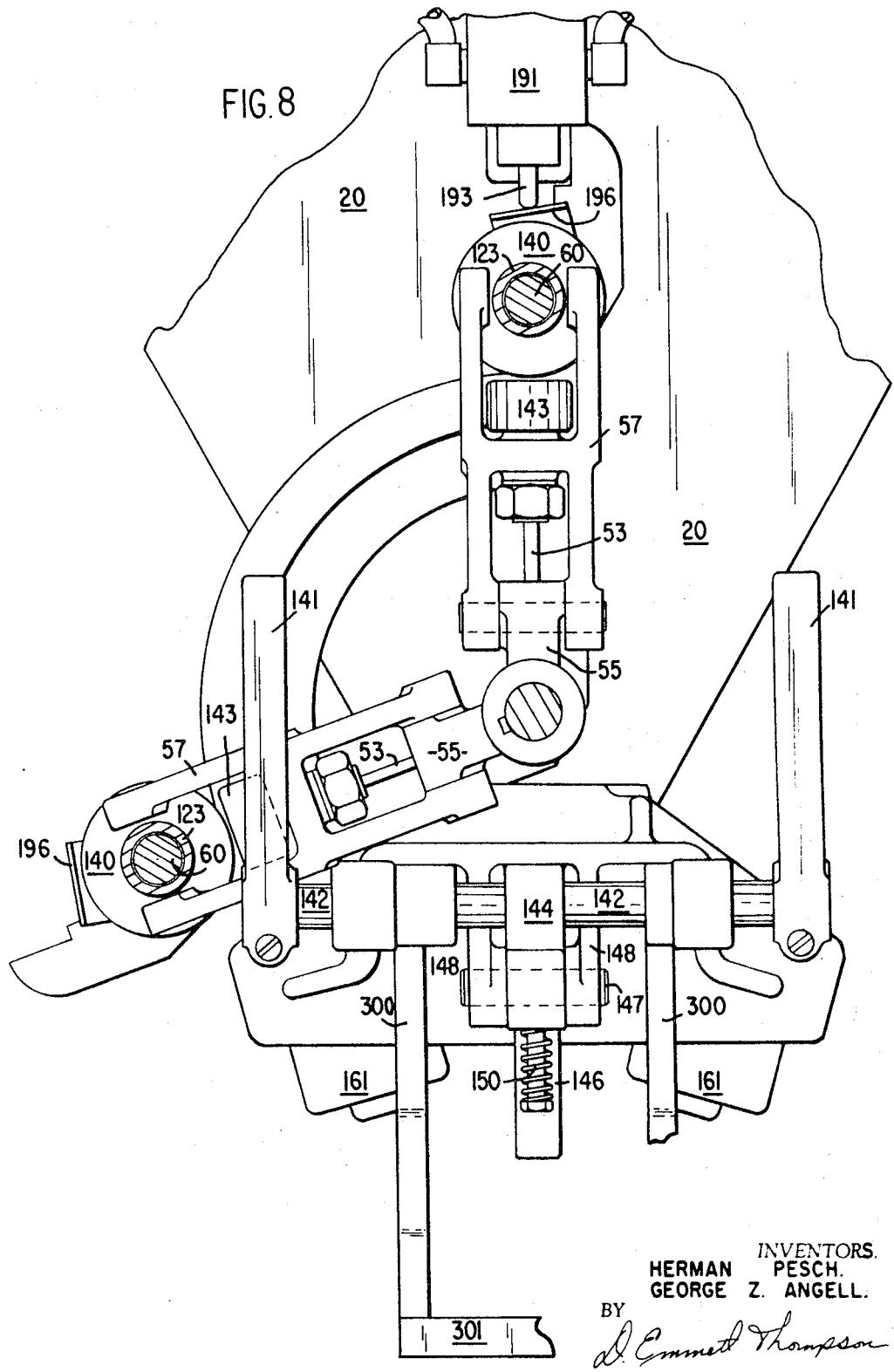

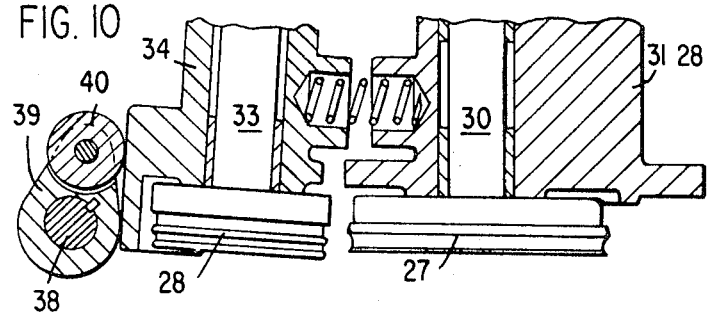
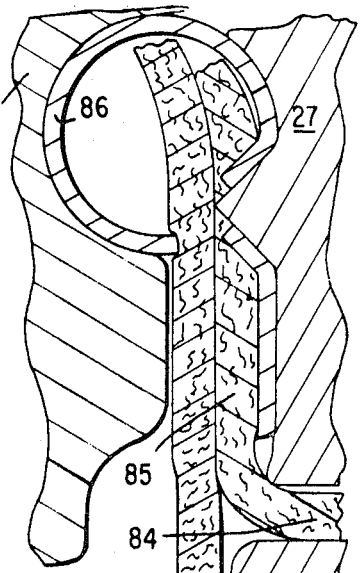
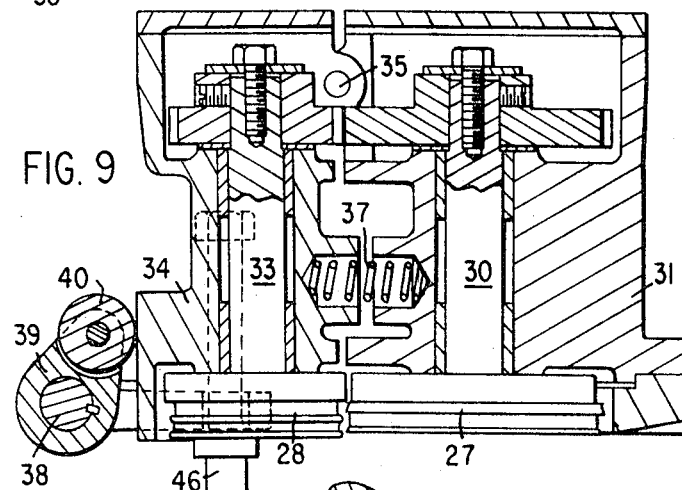
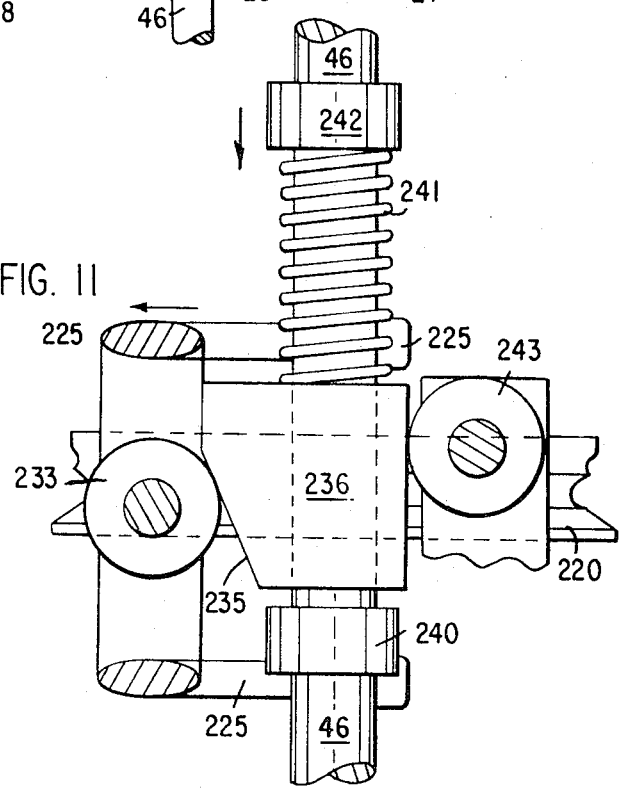
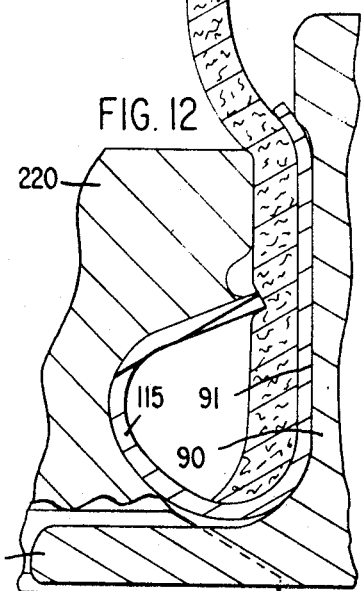
INVENTORS
HERMAN PESCH.
GEORGE Z. ANGELL.
BY
ATTORNEY

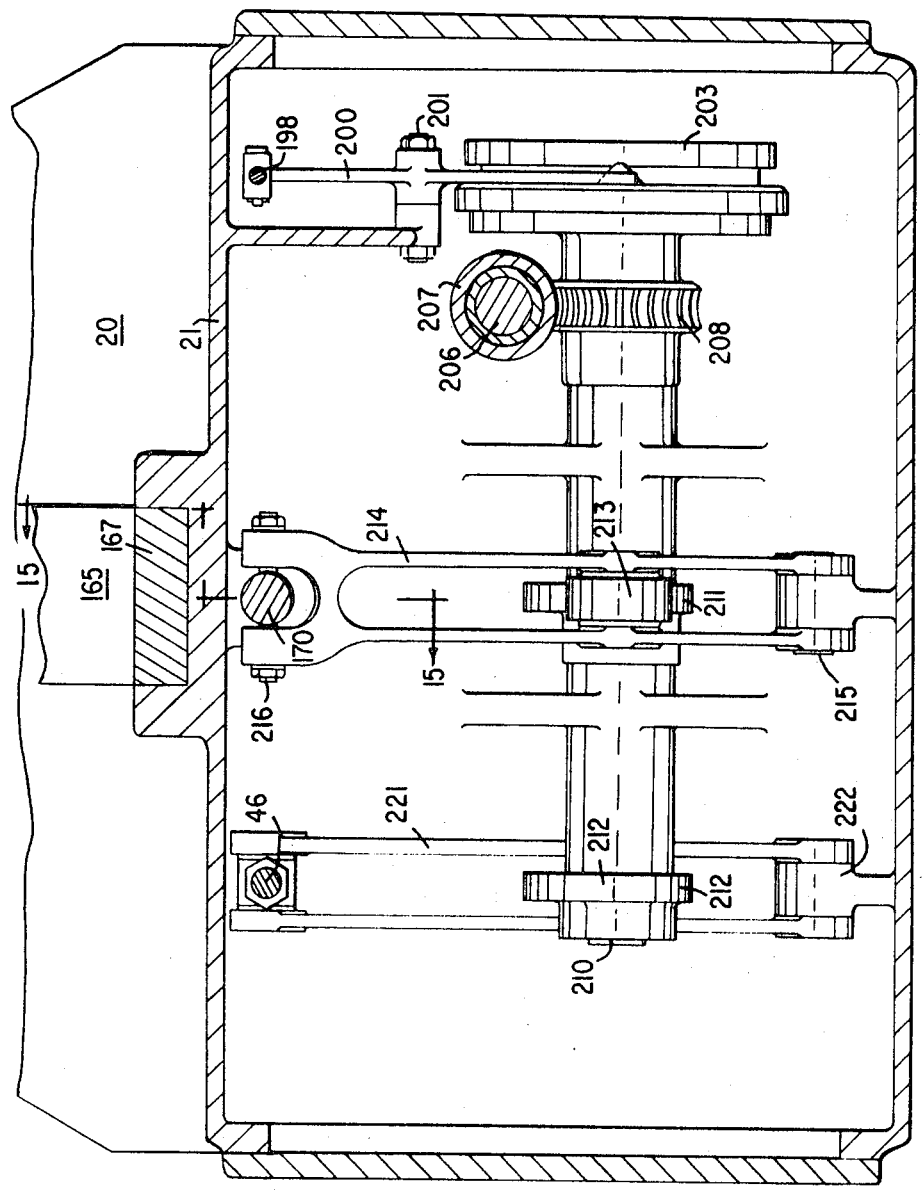

United States Patent Office 3,468,225
Patented Sept. 23, 1969

3,468,225
CONTAINER ASSEMBLING MACHINE
Herman Pesch and George Z. Angell, Fulton, N.Y., assignors to Phillips Petroleum Company, a corporation of Delaware
Filed Dec. 30, 1966, Ser. No. 606,079
Int. Cl. B31b 17/74
U.S. Cl. 93—36.5                    7 Claims

ABSTRACT OF THE DISCLOSURE

A machine for simultaneously fixedly crimping a reinforcing ring to the top edge of a paper container and affixing a bottom closure to the container by a crimped ring. The container barrel is sleeved over upper and lower chuck members, the lower chuck supporting a ring member. Jaws in both chucks are moved radially outwardly to round up the container barrel for insertion to the ring positioned in the lower chuck and for the reception of the bottom closure and ring member in the upper chuck. A conical cage member is carried by the lower chuck for guiding the container barrel thereon. The lower chuck acts as a back-up member for the lower ring while it is engaged by the lower crimping roll.

---

This invention has to do with a machine for assembling bottom closures and top rings to container barrels. The containers are of the type consisting of a cylindrical body, or barrel, formed of paperboard, or like material. A metallic ring, generally U shaped in cross section, is crimped onto the top edge of the assembled container, and serves to provide rigidity for the top of the container, and also as means for retaining a slip cover on the container after the contents has been placed therein. A bottom closure is fixed to the opposite end of the container barrel by a similar second metallic ring crimped in place. These containers are used extensively for packaging items, particularly food products in bulk, the containers having a capacity from two and one-half to five gallons, or more.

The container barrels are shipped in flat collapsed condition. A machine for assembling this type of container is shown in Patent No. 2,651,977. In the operation of that machine, a container barrel is expanded into substantially cylindrical form, and placed upon a container support. A first ring is positioned on the upper end of the barrel. The container support is mounted on a carrier movable about a vertical axis to position the upper end of the container and ring in operative relation to crimping rolls, which function to crimp the ring onto the end of the container barrel.

The support is then moved from the crimping rolls to the loading and unloading position. The container barrel is removed, inverted, and replaced on the container support. The bottom closure and the second ring is then positioned on the then upper end of the barrel, and the assembly is again moved into operative relation with the crimping rolls, and the bottom closure ring is crimped. The assembly is then returned to the loading and unloading position, and the assembled container removed from the assembling machine. The machine of the patent did an excellent job in assembling the containers. However, due to the double cycling involved in crimping the top and bottom rings separately, the productive output of the machine was not high.

This invention has as a general object, a container assembling machine which functions to simultaneously crimp both the top and bottom rings, whereby the machine only has to be cycled once to effect the assembly of a complete container and accordingly, this machine has double the production output of the former machine.

In general, the machine includes a support for a container barrel, bottom closure and both rings, the supporting structure having upper and lower chucks. The lower chuck is formed with a solid peripheral surface, and a radially outwardly extending flange immediately below said surface to receive a ring with the open channel facing upwardly. Both the upper and lower chucks have radially movable jaws which normally are positioned inwardly in contracted state to permit the first ring to drop onto the flange. Upon sleeving a container barrel over the upper chuck, the jaws of both chucks are expanded automatically by cam means, the jaws in the lower chuck serving to accurately guide the lower end of the barrel into the ring positioned on the flange, and to expand the upper end of the barrel in true cylindrical form for accepting the bottom closure which is then positioned therein.

The machine has upper and lower crimping rolls. The container barrel, rings and bottom closure assembly, is moved into registration with the crimping rolls, both rings being simultaneously crimped.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a top plan view of the container assembling machine embodying our invention shown with the cover removed from the box containing the driving gears for the upper crimping rolls.

FIGURE 2 is a view taken on line 2—2, FIGURE 1, with one of the container supporting assemblies removed.

FIGURE 3 is a vertical sectional view of one of the barrel supporting assemblies showing the chuck jaws in contracted position.

FIGURE 4 is a view, similar to FIGURE 3, showing the chuck jaws in expanded position, the section being displaced 90° from the section shown in FIGURE 3.

FIGURE 5 is a view taken on line 5—5, FIGURE 4.

FIGURE 6 is a view taken on line 6—6, FIGURE 4.

FIGURE 8 is a view taken on line 8—8, FIGURE 2.

FIGURE 9 is a view taken on line 9—9, FIGURE 1, showing the upper crimping rolls in crimping position.

FIGURE 10 is a view of the lower portion of FIGURE 9, showing the upper crimping rolls in separated position.

FIGURE 11 is a view taken on line 11—11, FIGURE 7.

FIGURE 12 is an enlarged sectional view of the container barrel including a portion of the bottom closure, top and bottom rings, and contiguous portions of the crimping rolls in crimping position.

FIGURE 13 is a view taken on line 13—13, FIGURE 2.

FIGURE 14 is a front elevational view of the right lower portion of FIGURE 2.

FIGURE 15 is a view taken on a line corresponding to line 15—15, FIGURE 13.

Figure 7:
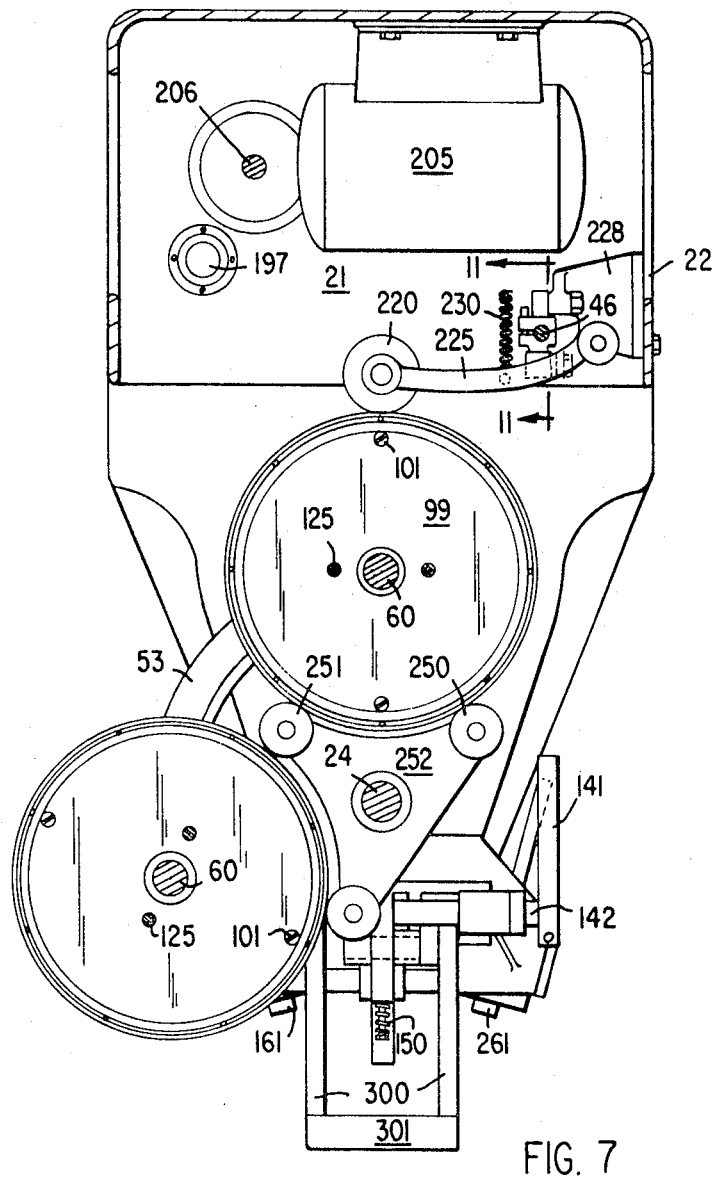
FIGURE 7 is a view taken on line 7—7, FIGURE 2.

The general arrangement of the machine is similar to that shown in Patent No. 2,651,977.

The frame of the machine includes a base section 20 formed with a gear compartment 21. A vertically disposed casting 22 is mounted on the base 20 and is provided at its upper end with a head structure 23. A shaft 24 is journalled at its lower end in the case 20, and at its upper end in the head 23. The head structure 23 includes inner and outer crimping rolls 27, 28. The roll 27 is fixed to the lower end of a shaft 30 journalled in a casting 31 fixed to the head plate 23, see FIGURES 9 and 10. The outer crimping roll 28 is fixed to the lower end of a shaft 33 journalled in a casting 34 pivotally connected at its upper end to the casting 31 by a pin 35. The casting 34 is urged outwardly from the casting 31 by a helical compression spring 37 interposed between the castings, whereby the outer roll 28 is normally spaced outwardly from the inner roll 27, as shown in FIGURE 10. The casting 34 is moved inwardly upon clockwise movement of a shaft 38, to which is affixed an arm 39 having a roller 40 journalled in a slot in the outer end of the arm. The shaft 38 is journalled in brackets 43 extending rearwardly from the head 23. The shaft has affixed to it an arm 45 to which a pull rod 46 is attached, see FIGURES 2, 7, 11 and 13. Downward movement of the rod 46 effects clockwise movement of the shaft 38, whereby roller 40, engaging the casting 34, moves it inwardly to the position shown in FIGURE 9. This upper crimping roll structure is substantially the same as shown in Patent No. 2,651,977.

A hub 50, FIGURE 2, is fixed on the lower end portion of the shaft 24 and is supported by a thrust bearing 51. A pair of arms 53 extend radially from the hub 50 and are spaced apart circumferentially. A hub 54 is also fixed on shaft 24 immediately above the hub 50, and is formed with brackets 55 positioned in registration above the arms 53. An arm 57 is pivotally mounted at one end in each of the brackets 55, the arms 57 also overlying the arms 43, see FIGURES 2 and 8.

A staff 60 is rotatably and slidably mounted in bearing bosses 61 formed in each of the arms 53. Downward movement of staffs 60 in arms 53 is limited by collars 63 fixed to the staffs. The staffs extend upwardly from the arms 53, and there is a container supporting assembly fixed to the upper ends of each staff, see FIGURES 2, 3 and 4.

The container supporting assemblies each include upper and lower chucks. The upper chuck includes a disk 65 having a central hub 66 positioned in a bore formed in the upper end of the staff and apertured to receive a screw 67 threading into the staff to fixedly secure the disk thereto. There is an annular series of jaw members 68 mounted on the under side of the disk 65. Each jaw is formed with an aperture 69 elongated in a direction radially of the disk 65, see FIGURE 5. A screw 70, carried by the plate 65, extends downwardly through the slot 69 of each jaw. A spacer sleeve 71 is positioned on each screw and is clamped against the under side of the disk 65 by a washer 73 and a nut 74 threaded on the lower end of the screw. An arcuate ring member 75 is fixed to each jaw 68, as by screws 77, the ring section 75 extending upwardly beyond the top surface of the disk 65.

The jaws 68 are formed on their under sides with an arcuate notch 79 in which there is mounted a garter spring 80, the spring serving to yieldingly contract the jaws inwardly against a cam disk 81 slidable axially of the staff 60. The cam disk 81 has a conical periphery and the inner arcuate ends of the jaws 68 are formed on a taper complemental to the conical surface on the cam 81. Accordingly, when the cam 81 is moved upwardly from the position shown in FIGURE 3, to the position shown in FIGURE 4, the jaws 68 will be moved outwardly into engagement with the barrel 83 of the container. The barrel, when positioned on the supporting structure as shown in FIGURE 4, extends upwardly beyond the jaw segments 75. The bottom closure, having a discoidal portion 84, is positioned on the segments 75, with the flange 85 of the closure engaging the inner surface of the barrel. A ring 86, of inverted U shape in cross section, is positioned on the end edge of the barrel and flange 85 of the bottom closure.

The lower chuck assembly includes a disk 87 having a central hub 88 fixed to the staff 60, as by pin 89, see FIGURES 3 and 4. An annular member 90 is fixed to the disk 87 and has a peripheral surface 91 and a flange 92 extending radially outwardly from the surface 91 immediately below the same.

An annular series of jaws 93 are mounted on the member 90. Each of these jaws is also provided with a radially elongated aperture 94, see FIGURE 6, similar to the apertures 69 in FIGURE 5, and the jaws are formed in their upper surface with an arcuate notch 95 in which is positioned a garter spring 96 for yieldingly urging the jaws inwardly against the conical periphery of a cam member 97, this general arrangement being similar to that described in reference to the upper chuck. The jaws 93 are overlaid by an annular member 98 which, in turn, is overlaid by a disk 99 secured to member 98 by screws 100. Screws 101 extend through the members 87, 90, 98, 99, and are provided at their lower ends with nuts 102. The intermediate portion of the screws 101 is encircled by a spacing sleeve 103.

There is mounted in the radially extending space between each of the jaws 93, a guide member 105 in the form of a flat plate having affixed thereto a stud 107 extending through the disk 87 and fixed thereto as by nut 108, see FIGURE 3.

There is affixed to the periphery of the annular member 98 a series of upwardly extending converging rods 110, the upper ends of the rods being fixed to a ring 111, which is positioned immediately below the upper chuck. The rods 110 form a circular cage for guiding a container barrel 83 when it is sleeved downwardly over the upper chuck. Previous to the application of the container barrel to the supporting assembly, ring 115, similar to the ring 86 but with the channel facing upwardly, is dropped over the upper chuck and descends to the flange 92, as shown in FIGURE 3. In order to permit the ring 115 to drop freely onto the flange 92, the diameter of the disk 99 and that of the annular member 98 is slightly less than the diameter of the surface 91 on member 90. When the ring 115 is dropped onto the flange 92, the jaws 93 are contracted—that is, moved to in position, as shown in FIGURE 3, so that the arcuate projecting part 117 of the jaws is also positioned within the periphery of the members 98, 99. However, there would then be exposed a marginal edge surface 120 on the member 90, see FIGURE 3, on which the descending ring 115 might catch.

The guide plates 105 are formed on their outer edges with straight vertical surfaces 121 which extend downwardly from the periphery of the member 98 and merge with an outwardly flaring surface 122 which serves to guide the descending rings 115 over the surface 91 onto the flange 92.

The intermediate portion of each of the staffs 60 is surrounded by a tube 123 to which is fixedly secured a disk 124 provided with four equally and circumferentially spaced apertures to receive the lower ends of rods 125, FIGURE 3, and 126, FIGURE 4. The lower ends of the rods 125, 126 are fixedly secured to the disk 124. Rods 125 extend upwardly through clearance holes formed in the lower chuck, see FIGURE 3, and are fixedly secured to the cam member 81 by cap screws 130. The rods 126 are secured at their upper ends to the cam member 97 by cap screws 131. The cam member 81 is urged upwardly by a helical compression spring 133 encircling the staff 60 and interposed between the hub of the cam member and a collar 135 fixed to the staff. Accordingly, when the sleeve 123 is permitted to move upwardly, both the cam members 81 and 97 are moved upwardly to expand the jaws in both chucks.

As stated, there are two staffs 60 carried by the support 50, 53, the staffs being spaced apart on an arc of about 110° about the center of the shaft 24.

In FIGURE 1, one of the container supporting assemblies, indicated at A, is shown positioned outwardly and at the left of the machine. This is the loading and unloading station. The other container supporting assembly, indicated at B, is positioned inwardly for the crimping operation. When the two rings have been crimped on the container barrel at position B, the two supporting assemblies are moved about the axis of the shaft 24 in a clockwise direction, FIGURE 1, whereupon assembly B moves forwardly and to the right of the machine, and the assembly at A is moved inwardly from the crimping operation.

In the operation of the machine, a ring 115 is placed over the upper chuck of the supporting assembly in position A, permitting it to drop onto the flange 92. At this time, the jaws of the upper and lower chucks are contracted. The reason the chuck jaws are contracted is because the sleeve 123, at position A, has been moved downwardly and retained in that position. Each of the sleeves 123 is provided with a collar 140, FIGURES 2 and 8. When a supporting assembly has been moved to the loading and unloading position, as indicated at A FIGURE 1, the arm 57, FIGURE 8, is moved under an arm 141 affixed to one end of a shaft 142 and extending inwardly therefrom, see also FIGURE 14. As the supporting assembly is moved about the axis of shaft 24 from position B to the loading and unloading position, the arm 141 is held in horizontal position, and the under surface of the ram is engaged by a roller 143 journalled in the bifurcated portion of the arm 57, the outer end portion of which straddles the sleeve 123 and overlies the collar. The result is that the arm 57 is moved downwardly, and the bifurcated end of the arm overlying the collar 140 effects downward movement of the sleeve 123. It will be apparent, see FIGURE 8, that there are two of the arms 141 for effecting downward movement of each sleeve 123 as the associated supporting mechanism is moved to the loading and unloading position.

There is affixed to the shaft 142, a depending arm 144, the lower end of which is engaged by a latch arm 145 associated with a depending arm 146, see FIGURE 2. The arm structure 145, 146, is journalled on a pin 147 carried by ears 148 forming part of a bracket 149 fixed to the base structure 20. The arm 146 is urged in a clockwise direction, FIGURE 2, by a compression spring 150 carried by a rod 151 attached to the bracket. Accordingly, the latch arm 145 is urged upwardly for engagement by the arm 144, thus preventing upward movement of the arm 141. With this arrangement, the sleeve 123 is moved downwardly and the chuck jaws contracted when a supporting structure is swung about the shaft 24 to the loading and unloading position.

With the first ring 115 positioned on the flange 92 of the lower chuck structure, the container barrel 83 is sleeved over the upper chuck structure. As it is moved downwardly, it engages one of the wing members 153 of the actuator of an air valve 155 carried by a bracket 156 attached to the head 23 and in which bracket the upper end of the shaft 24 is also journalled. Actuation of the valve 155 supplies fluid under pressure to a cylinder 157 mounted on the bracket 149, causing the piston rod 158 to move forwardly engaging the arm 146 to effect counterclockwise movement thereof together with the latch arm 145, moving the same out of latching engagement with the arm 144, permitting the arm 141 to move upwardly and likewise, the arm 57. This permits the sleeve 123 to move upwardly by action of spring 133, causing the jaws 68 and 93 of the upper and lower chuck structures to move outwardly.

As previously stated, the now outwardly positioned jaws 93 in the lower chuck structure serve to guide the lower portion of the barrel 83 into the ring 115 on flange 92. Thereupon, the bottom closure 84 is positioned on the jaw segments 75, and the ring 86 is positioned on the upper end of the barrel and over the flange 85 of the bottom closure. The operator then presses a button 160, FIGURE 2, to admit fluid pressure to a cylinder 161, moving a piston therein inwardly, the end of the piston rod engaging the staff supporting arm 53, impelling the container assembly supporting structures to move in a clockwise direction, FIGURE 1, whereby the structure just loaded at position A is swung into the position B.

This movement results in the lower end of an adjustable screw 163, threading into the lower end of the staff 60, entering a slot formed in a wear piece 164 fixed in the forwardly extending arm portion 165 of a member 167 slidably mounted for vertical movement in a slot formed in the front side of the gear housing 21. The member 167 has a hub portion 168 mounted on a rod 170 slidably mounted in the gear box. The push rod 170 is formed with an elongated aperture 180, see FIGURE 15, extending lengthwise of the rod. A pin 181 is fixed in the hub 168 and extends through the aperture 180. The lower part of the hub is counterbored to receive a compression spring 183 actuating between the bottom of the counterbore and a collar 185 fixed to rod 170. The spring functions to urge the hub upwardly with pin 181 against the top of slot 180.

The wear piece 164 is formed with surfaces 187 inclined upwardly from each side edge of the piece to each side edge of the slot. Accordingly, when the assembly approaches crimping position, the member 167 is cammed down against spring 183 by the screw engaging the inclined surface 187. This acts as a brake to stop the swinging movement of the assembly which was initiated by the kick from cylinder 161.

A bracket 190 is pivotally mounted on the hub 168 and carries an air valve 191 having a forwardly extending actuating plunger 193. The upper bearing portions 61 of the arms 53 of the carriers for the container assembly supporting structures are with extensions 195. These bearing portions are also provided with angle plates 196. When a supporting assembly is moved from the loading and unloading station to the crimping station, the angle plates 196 move the plunger 193 inwardly to actuate the valve 191. When so actuated, this valve provides air pressure to a cylinder 197, FIGURE 2, mounted on the top of the gear box 21, the cylinder functioning to move a rod 198 downwardly. The lower end of this rod is connected to a lever 200 pivoted at 201, see also FIGURE 13. The opposite end of the lever 200 forms a trip for a one revolution clutch 203.

A motor 205 is mounted on the upper frame casting 22 and has an output shaft 206 extending into the gear box and being provided with a worm 207 engaged in mesh with a worm wheel 208 connected to the driving part of the one revolution clutch 203. The driven part of the clutch is connected to a shaft 210, and when the clutch is tripped, the shaft 210 makes one revolution.

Cams 211, 212, are fixed onto the shaft 210, the cam 211 is engaged by the roller 213 connected by a follower lever 214 pivoted at one end to the side of the gear box by a pin 215. The opposite end of the lever is bifurcated in the vertical plane to engage the push rod 170 and in the horizontal plane to provide fingers above and below a pin 216 extending through the push rod 170. Cam 211, follower 214, and push rod 170, effects upward movement of the member 165, moving the staff 60 upwardly. This upward movement of the staff and the supporting assembly carried thereby, moves the ring 86 into registration between the crimping rolls 27, 28, and moves the lower ring member 115 into registration with a lower crimping roll 220.

Cam 212 actuates a follower lever 221, which is located below the shaft 210, and is pivotally mounted at one end to a bracket 222 formed on the side wall of the gear box. The opposite end of the lever 221 is pivotally connected to the pull rod 46, the upper end of which is connected to the arm 45, FIGURE 1, and this movement moves the arm 39 in a clockwise direction, FIGURES 9 and 10, to move the outer crimping roll 28 against the ring 86, the inner surface of the ring being pressed against the inner crimping roll 27.

The lower crimping roll 220 is journalled in the free end of an arm 225, see FIGURE 7, pivotally mounted at its opposite end on a pin 227 carried by a bracket 228 fixed to the frame section 22. A tension spring 230, connected to the arm 225, urges the lower crimping roll away from the container assembly. The arm 225 is provided, intermediate its ends, with a roller 233 which is arranged to be engaged by an inclined surface 235 formed on a cam block 236. The block 236 is slidably mounted on the pull rod 46, see FIGURE 11. Its downward position is controlled by a limit collar 240 fixed to the rod. The block is urged downwardly against the collar 240 by a compression spring 241 interposed between the block and an upper collar 242 fixed to the rod. As the rod 46 is pulled downwardly by cam 212 and follower 221, the inclined surface 235 of block 236 cams the arm 225 in a counterclockwise direction, FIGURE 7, to swing the lower crimping roll 220 against the outer surface of the lower ring 115. There is a back-up roll 243 acting against the side edge of the block opposite to the inclined surface 235. It will be apparent that the pressure of the crimping roll 220 against the ring 115 is through spring 241.

Accordingly, it will be apparent that upon commencement of the rotation of shaft 210, the staff and the container supporting assembly is moved upwardly to bring the rings in registration with the crimping rolls, and the crimping rolls are moved into crimping engagement with the rings. It will be apparent that the inner surface of the ring 115 is backed up by the surface 91 on the member 90 of the lower chuck formation. In order to relieve lateral strain on the staff 60, caused by the action of the lower crimping roll 220, the periphery of the flange 92 is engaged by a pair of rolls 250, 251, see FIGURE 7, rotatably mounted on a triangular shaped plate 252 fixed to the shaft 24, the rolls 250, 251, engaging the flange at circumferentially spaced areas located diametrically opposite of the lower crimping roll 220. In view of the fact that the rolls 250, 251, are located from the axis of the shaft 24 to engage the periphery of flange 92, the rolls are spaced outwardly a distance greater than the diameter of the ring 115, whereby the rolls do not interfere with the descent of the ring onto the flange 92.

It will be apparent, from the arrangement described, that the drive from the motor to the upper rolls 28, 27, is such that when the rolls are in crimping engagement with the ring 86, rotary motion is imparted to the supporting structure and container assembly thereon, the assembly making several revolutions while the crimping rolls are in crimping engagement with the rings 86, 115.

As the shaft 210 nears the completion of the revolution thereof, the cam 212 permits upward movement of the pull rod 46 to separate the upper crimp rolls 27, 28, and the cam 211 is effective to permit movement of the elevating member 174 downward for the return of the staff 60, and the supporting structure thereon, to down position.

When the staff 60 was elevated by member 174, the air valve 191 was elevated, moving the actuating plunger 193 out of engagement with the angle plate 196, FIGURE 2, permitting the plunger to move outwardly over the angle plate which, of course, is not elevated because it is fixed to the carrier 53. This permits return of the valve 191 to normal position. Upon descent of the member 174, the valve moves about the pivot of the bracket 190 to the dotted line position shown in FIGURE 2, so that there is not another valve actuation to cause recycling of the machine.

In the meantime, the operator has placed a container assembly on the supporting structure at the right side of the machine and upon completion of the crimping operation, the button 160 is again pressed to effect operation of the cylinder structure 261, FIGURE 7, to impel the supporting structures to move counterclockwise, FIGURE 7, to bring the right hand assembly into crimping position. With this arrangement, both the top ring of the completed container and the bottom retaining ring are crimped simultaneously.

A pedal arrangement is provided for contracting the chuck jaws after the cylinder arrangement 157, 158, has tripped the latch 145, FIGURE 2, and before the container supporting assembly has been moved from the loading and unloading position by operation of one of the cylinders 161, 261. There might be a case where the operator would desire to remove a container assembly from the supporting structure before it is moved to the crimping position. A pedal structure is pivotally mounted in the bracket arrangement 149. It includes a pair of forwardly and downwardly extending arms 300. The lower ends of these arms are connected by a cross member 301. The pedal includes an upwardly extending arm 303 positioned inwardly of and overlapping a depending arm 304 fixed to the shaft 142 to which the arms 141 are fixed. The pedal structure also has another upwardly extending arm 305 to receive a rod 306 having a compression spring similar to the spring 150, whereby the pedal structure does not normally exert any pressure on the arm 304. In the event the operator decides to remove a container assembly, downward pressure on the pedal cross member 301 will move the arms 141 downwardly to, in turn, move the sleeve 123 downwardly and the cam members 81 and 97 downwardly to permit the jaws to be contracted by the garter springs 80, 96. The pedal structure may be depressed during application of another container assembly.

The extent of the upward movement of sleeve 123 and accordingly the cams 81, 97, is controlled by a collar 310 threaded on the upper end of the sleeve 123. In the up position, the collar strikes against the hub 88 of disk 87, which is fixed to the staff 60. By adjusting the collar 310 on the sleeve, the up position of the cams 81, 97 may be varied. By adjustment of nuts 311 on the rods 125, the up position of cam 81 may be varied independently of cam 97. By means of these adjustments, both ends of the barrel 83 can be brought to the proper diameter.

What we claim is:

1. A machine for assembling a container consisting of a cylindrical barrel, a top channel ring crimped to the upper end of the barrel, and a bottom closure fixed by a crimped channel ring to the opposite end of the barrel, said machine comprising a frame, upper and lower crimping rolls journalled in the frame and being spaced apart vertically comparable to the length of the container barrel, a carrier, container assembly supporting means mounted on said carrier and including upper and lower chucks fixed to a vertically disposed staff mounted in said carrier for rotatable and axial movement therein, said lower chuck having a peripheral flange for supporting a channel ring member with the open side thereof facing upwardly to receive the lower end portion of a container barrel encircling said chucks, with the upper end of said barrel terminating above said upper chuck, said upper chuck supporting a flanged bottom closure positioned in the upper extending end portion of the barrel, with a second channel ring member overlying said extended portion of the barrel and the flange of said bottom closure, said upper and lower chucks each including an annular series of jaws movable radially outwardly into engagement with the upper and lower end portions of said barrel, and power means operable to bring said crimping rolls into crimping engagement with said channel ring members, said crimping rolls being operable upon such engagement to fixedly crimp said ring members to the barrel.

2. A container assembling machine as set forth in claim 1, including means for adjusting the extent of the outward movement of said jaws.

3. A machine for assembling containers as set forth in claim 1, wherein said lower chuck is provided with a solid peripheral surface immediately above said peripheral flange, said surface serving to back up the channel ring member positioned on said flange during engagement of said ring member by said lower crimping roll.

4. A container assemblying machine as set forth in claim 1 including guide members fixed to said lower chuck intermediate said jaws for guiding the channel ring member onto said flange.

5. A container assembling machine as defined in claim 1, including means for yieldingly moving the jaws in said chucks outwardly into engagement with the container barrel.

6. A container assembling machine as defined in claim 1, including a conical shaped cage structure fixed to said lower chuck and extending upwardly therefrom toward said upper chuck and serving to guide the container barrel onto said lower chuck.

7. A container assembling machine as defined in claim 1, and including means operable to move said jaws outwardly upon downward movement of said barrel over said upper chuck toward said lower chuck.

References Cited

UNITED STATES PATENTS

| | | | |
|---|---|---|---|
| 2,444,515 | 7/1948 | La Bombard | 93—55 |
| 2,584,718 | 2/1952 | Laabs | 93—55 |
| 2,651,977 | 9/1953 | Wilcox | 93—55 |
| 2,671,490 | 3/1954 | Jansen | 93—55 X |
| 305,830 | 9/1884 | Marques. | |
| 3,195,426 | 7/1965 | Bauer | 93—39.1 |
| 3,382,773 | 5/1968 | Pellaton. | |

WAYNE A. MORSE, JR., Primary Examiner

U.S. Cl. X.R.

29—243.52; 93—39.1, 55.1, 59, 94; 113—120